(No Model.)

5 Sheets—Sheet 1.

R. W. BAYLEY.
FLUID PRESSURE BRAKE.

No. 493,904.

Patented Mar. 21, 1893.

WITNESSES:
R. N. Whittlesey
F. E. Gaither

INVENTOR,
Richard W. Bayley
by Brenden Bell,
Att'y.

(No Model.)  5 Sheets—Sheet 2.

R. W. BAYLEY.
FLUID PRESSURE BRAKE.

No. 493,904. Patented Mar. 21, 1893.

WITNESSES:
R. N. Whittlesey
F. E. Gither

INVENTOR,
Richard W. Bayley,
by J. Nowden Bell, Att'y.

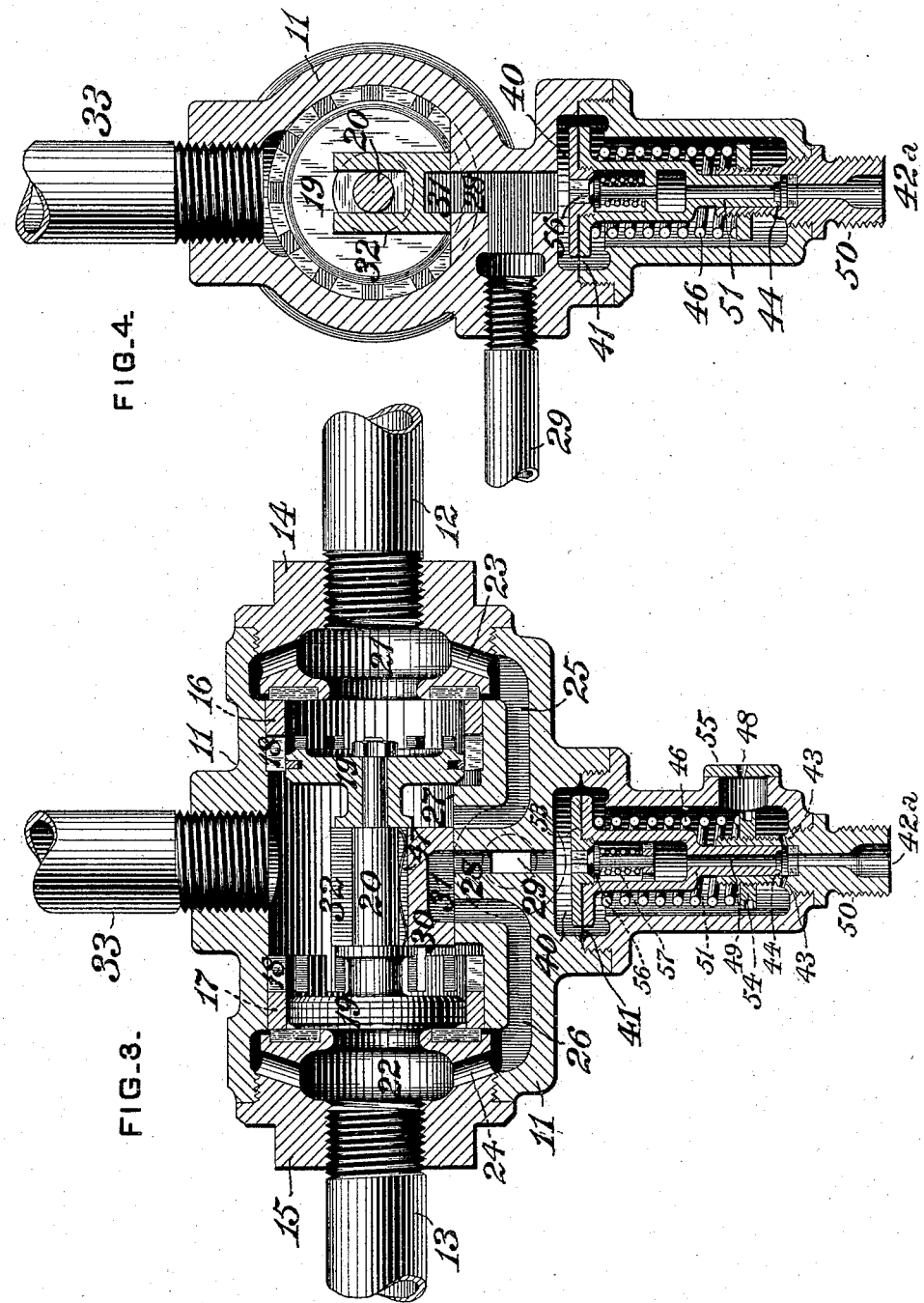

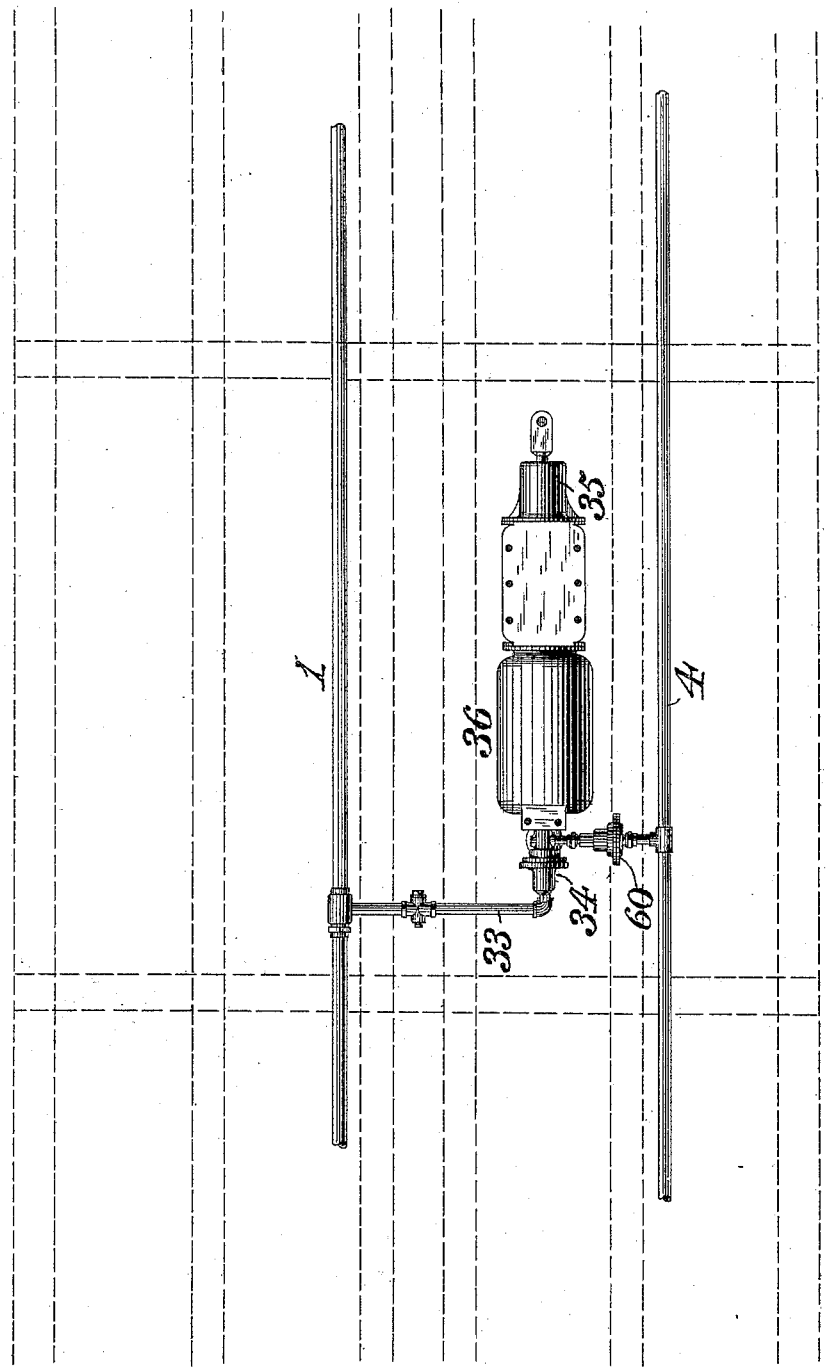

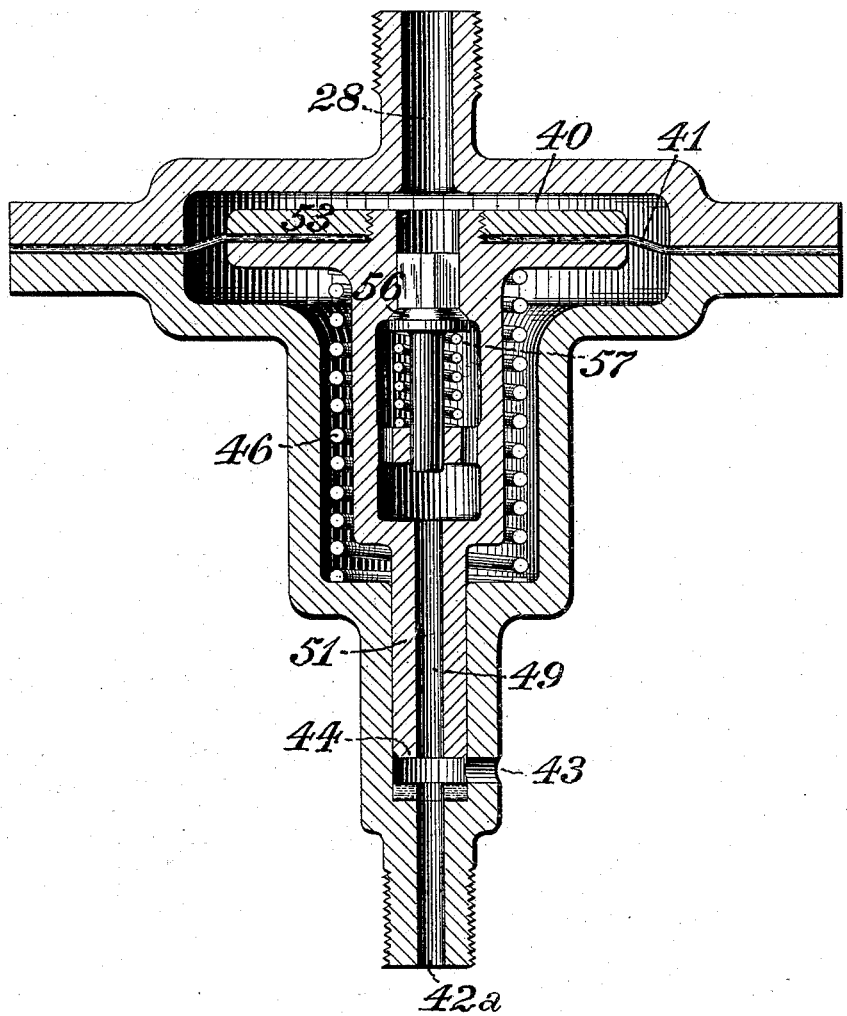

UNITED STATES PATENT OFFICE.

RICHARD W. BAYLEY, OF PITTSBURG, PENNSYLVANIA, ASSIGNOR TO THE WESTINGHOUSE AIR BRAKE COMPANY, OF SAME PLACE.

FLUID-PRESSURE BRAKE.

SPECIFICATION forming part of Letters Patent No. 493,904, dated March 21, 1893.

Application filed December 16, 1891. Serial No. 415,238. (No model.)

*To all whom it may concern:*

Be it known that I, RICHARD W. BAYLEY, a citizen of the United States, residing at Pittsburg, in the county of Allegheny and State of Pennsylvania, have invented or discovered a certain new and useful Improvement in Fluid-Pressure Brakes, of which improvement the following is a specification.

The object of my invention is to provide means whereby the auxiliary reservoirs of an automatic brake system may be recharged after an application of the brakes without releasing the brakes, and whereby the brake cylinders may be charged with air directly from the main reservoir on the locomotive to apply the brakes without operating the usual automatic devices, and may be recharged, or the pressure therein increased after an application of the brakes either automatically or directly; thus producing a combined automatic and direct brake system in which the brake cylinder pressure may be at all times completely controlled by the engineer.

My improvement is adapted for operation with two lines of train pipe, one of which is connected to the usual automatic brake devices and the pressure in which is increased or decreased to release or to apply the brakes automatically. The other line may be a line of pipe the pressure in which is independent of that in the main line, or it may be one which is connected with the train pipe of an automatic system by the means set forth in Patent No. 425,059, granted and issued to George Westinghouse, Jr., April 8, 1890. When connected as in said patent, either of the two lines of pipe may be employed as a signal pipe; and when the second line of pipe is not so connected it may also serve as a signal pipe, but it is not essential in either case that the train signaling devices should be operative through either of these lines. It is, however, an advantage of either system, that the usual signal pipe may be employed to perform the functions of the second line of pipe embodied in my improvement without preventing its use for signal purposes.

Figure 1:
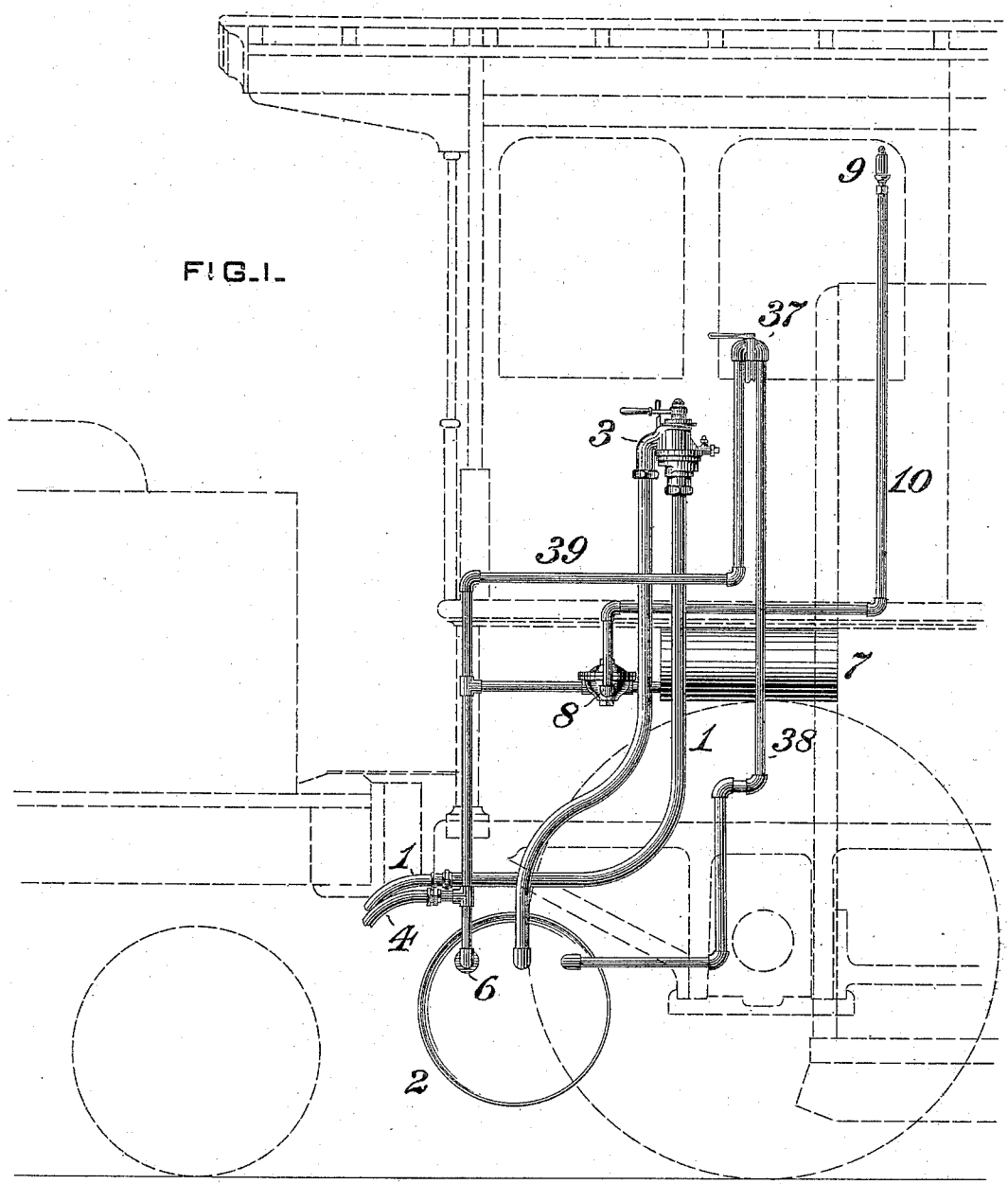
Figure 2:
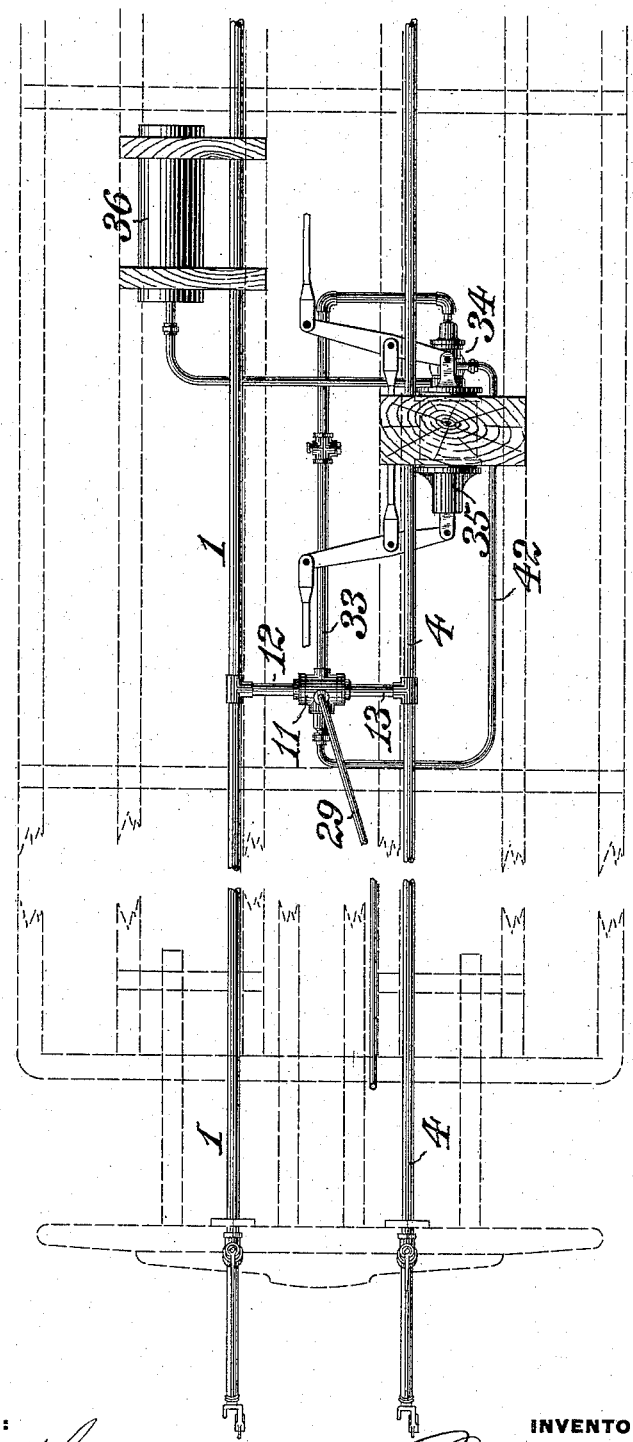

In the accompanying drawings, Figure 1 is a side view in elevation illustrating the connections of the brake and signal pipes of an automatic air brake system upon a locomotive-engine; Fig. 2, a plan or top view of the main portion of the brake apparatus of a railroad car, illustrating the application of means for controlling exhaust from the brake cylinder and the admission of air thereto; Fig. 3, a longitudinal central section through the reversing-valve mechanism pressure retaining valve and brake cylinder charging valve; Fig. 4, a transverse central section through the same; Fig. 5, a plan or top view of a portion of a brake apparatus illustrating a modification of the application of my invention, and Fig. 6, a central section, on an enlarged scale through a combined pressure retaining and charging valve.

As exemplified in Figs. 1, 2, 3, and 4, my pressure retaining valve and charging valve are shown in combination with a reversing valve similar to that set forth in Letters Patent No. 425,059, aforesaid. The engineer's valve on the locomotive is connected to the main reservoir, 2, and the train pipe, 1, as in the standard Westinghouse automatic system. The supplemental train pipe, 4, is shown connected to the signal valve, 8, and, through a reducing valve 6, with the main reservoir 2, and is also connected, by means of the pipe 39 to the valve, 37, which valve is connected to the main reservoir, 2, by the pipe 38 in order that the pipe 4 may be charged directly from the main reservoir through the valve 37. The pipes 1 and 4 are connected by the branch pipes 12 and 13 respectively to the opposite ends of the casing 11 of a reversing valve mechanism, one of which is provided under each car, the pipes 12 and and 13 being secured to the heads or caps 14, 15, which close the ends of the casing 11, and in which are formed chambers 21 and 22, respectively. Sleeves or bushings, 16, 17, are fitted into the casing 11 at its ends, a series of slots or passages 18 being formed in each bushing at and near its inner end. A reversing-valve formed of two end pistons, 19, secured upon a connecting stem, 20, is fitted to move freely in the valve-casing 11, the valve pistons 19 fitting and working in the bushings 16 and 17, and the width of the pistons and traverse of the valve being such that at either end of the stroke of the latter the piston at that end will close communication between the interior of the casing and the chamber of the adjacent head 15 or 14, as the case may be, and communication will be open past the piston at the opposite end through the slots 18, between the chamber of the head adjacent to said piston and the exterior of the valve-casing. The chambers, 21, 22, of the heads, 14, 15, are connected by ports, 23, and 24, with ports, 25, and 26, formed in the valve-casing 11, and opening at their inner ends on a valve face, 27, therein, which is located between the inner limits of the traverse of the valve pistons 19. A port 28 opens at its inner end on the valve face 27, between the openings of the ports 25 and 26, the port 28 extending from the valve-face to a connection with a pipe 29, leading to the discharge-valve of the signal pipe of the car.

The openings of the ports 25, 26, and 28, are controlled by a slide valve, 30, having an internal recess or cavity, 31, similar to the exhaust-recess of a steam-distribution slide valve, and provided with wings 32, which extend on opposite sides of the stem 20 of the reversing-valve and abut at their ends against collars on the inner sides of the end pistons, 19, of said valve, so that the slide-valve, 30, will move coincidently with the reversing-valve throughout and in each direction of the traverse of the latter. The slide-valve 30 is held in contact with the valve-face by a spring 47. The space within the valve-casing, 11, between the end pistons of the reversing-valve is connected by a pipe 33 with the triple valve 34 of the brake apparatus so as to open into the cap thereof on the train pipe side of the triple valve piston the triple valve being connected in the usual manner with the brake cylinder 35 and auxiliary reservoir 36. The pipe 33 serves to supply air under pressure to the auxiliary reservoir through the triple valve, and performs in the reduction of pressure for applying the brakes the same function as the brake pipe 1, being practically equivalent to a continuation of the same.

Fig. 3 shows the position occupied by the reversing-valve and connected slide-valve during such period as a preponderance of pressure is maintained in the brake-pipe 1, over that in the signal pipe, 4, the same forcing the valves to the left and maintaining communication between the brake pipe and triple valve through the pipe 33, the slots 18 in the end bushing of the valve-casing adjacent to the pipe 12 and the ports 23 and 25 and pipe 33. Upon a reduction of pressure in the brake pipe to a degree below that in the signal-pipe, as would be occasioned by placing the brake-pipe of a car in communication with the signal-pipe line of the remainder of a train or by the rupture of the brake pipe, the then greater pressure in the signal pipe forces the reversing-valve and slide-valve to the right, the signal pipe then communicating with the triple valve through the pipe 13, slots 18 in the adjacent end bushing of the valve casing, ports 24 and 26 and pipe 33. The signal pipe is then in condition to transmit air at the higher pressure required for braking purposes to the triple valve 34, such higher pressure being admitted by a supplemental engineer's brake valve 37, provided for the purpose and communicating by pipes 38 and 39 with the main reservoir 2, and the signal pipe 4, respectively. The slide valve 30, moving to the right coincidently with the reversing-valve, establishes communication between the car discharge-valve port 28 and the port 25, and through said ports and the pipes 29 and 12 between the car discharge-valve and the brake-pipe 1, thereby adapting the brake-pipe to perform the function of the signal pipe by providing the brake-pipe with the necessary vent for actuating the signal-valve 8 by a reduction of pressure in the brake-pipe. It will thus be seen that in either position of the reversing-valve the car discharge-valve port 28 and connecting-pipe 29 are in communication with the end chamber of the valve-casing 11, in which the lower pressure of air is maintained—that is to say, the chamber which is connected with the pipe then acting as the signal pipe.

The reversing-valve mechanism above described is similar to that shown in Patent No. 425,059, aforesaid, and does not, in and of itself, form part of my present invention. I have, however, combined therewith what may be termed a compound valve, 60, consisting of a pressure retaining valve for closing the exhaust passage from the brake cylinder to the atmosphere, and a charging valve through which the brake cylinder may be charged with air under pressure directly from the main reservoir on the locomotive. Both of these valves are operated by pressure in the second or supplemental line of pipe. If the second or supplemental line is employed as a signal pipe the pressure retaining valve will be so adjusted as to be closed by a given pressure above that normally existing in the signal pipe, and the charging valve will be so adjusted as to be opened by a greater pressure than that necessary to close the pressure retaining valve.

The lower end of the port 28 communicates with a chamber 40, the car discharge valve connection pipe 29 communicating with a lateral branch of the port 28. The chamber 40 is fitted with a movable abutment, which is preferably, as shown, a flexible diaphragm 41, secured at its periphery to the chamber, and said chamber communicates by an opening 48, on the outer side of the diaphragm 41, with the atmosphere. Ports or outlets 43 for the discharge of air delivered from the brake cylinder by the triple valve and through the pipe 42 are formed in the outer end of the chamber 40 and are governed by a valve 44, the stem of which is secured to the diaphragm 41. The valve 44 is held normally open or unseated by a spring 46, of higher tension than the usual or working pressure of air in the signal or low-pressure conducting-pipe. When it is desired to close the exhaust of air from the brake cylinder, the engineer, by means of the valve 37, admits a sufficient pressure of air to the signal-pipe to overcome the tension of the spring 46, which pressure, acting upon the diaphragm 41, closes the valve 44, thereby closing the outlet of the pipe 42 and preventing the exhaust of air from the brake-cylinder until such increase of pressure is relieved.

It will be seen that while my pressure retaining valve performs the same function as the pressure retaining valve shown in Patent No. 425,059 aforesaid, it differs therefrom in construction and arrangement, and its operation by means of pressure admitted to it from the locomotive renders it less liable to variation or uncertainty caused by different degrees of pressure in the brake cylinder. This is due to the fact that the pressure above the diaphragm 41, in the passage 28 and in the upper part of the chamber 40, has only the predetermined pressure of the spring 46 to act against, and is not exposed on its lower side to the pressure in the brake cylinder, except to the small extent due to the opening 49 through the stem of the valve. As the area of the opening 49 is small, pressure from the brake cylinder on the lower side of the diaphragm is only of slight effect.

As shown in Fig. 3, the lower portion of the chamber 40 is always open to the atmosphere through the opening or port 48. A plug 50, having an opening or nozzle 42ᵃ to which the pipe 42 is connected, closes the outer end of the chamber and contains the seat for the valve 44 which is formed on the end of a tubular stem 51. The plug 50 is screw threaded on its inner end and a nut 54 is fitted thereon which forms an adjustable bearing for the spring 46. It will be seen that the nut 54 may be adjusted by removing the cap 55 and without disconnecting any of the other parts or rendering them inoperative while the adjustment is being made.

The diaphragm 41 has a central opening and is clamped between the upper part of the stem 51 and a plate 53 on the upper side of the diaphragm. The plate 53 has a central opening which is normally closed by a valve 56, located in a chamber formed in an enlargement of the stem 51. This valve 56, is held to its seat by a spring 57 which is of such tension that the valve 56 will be opened by a pressure greater than that required to compress the spring 46 and close the valve 44. The purpose of this valve is to admit of charging the brake cylinder after the pressure-retaining valve has been closed by the pressure in the pipe with which the upper part of the chamber 40 is connected.

When it is desired to recharge the auxiliary reservoir without releasing the brakes, the pressure in the pipe 1, or 4, (whichever may be at the time in connection with the chamber 40) is increased so as to close the pressure-retaining valve 44, and at the same time, or at any time after closing the pressure-retaining valve, pressure is increased in the other pipe which is then in communication with the pipe 33 and through it with the triple valve piston chamber, thereby shifting the triple valve to release position so as to open the feed port to the auxiliary reservoir and to connect the brake cylinder port with the exhaust port opening into pipe 42. Additional pressure may then be admitted to the brake cylinder, without again reducing pressure in the automatic brake pipe, by increasing the pressure in the pipe communicating with the chamber 40 to a degree sufficient to open the valve 56, when air will pass through the passage 49, pipe 42 and the interior of the triple valve casing to the brake cylinder. It will be seen that the pressure in the brake cylinder may be thus increased to any degree below that existing in the pipe connected to the triple valve, and that, while the triple valve is in release position, the pressure may be reduced in the brake cylinder by reducing the pressure in the pipe communicating with the upper part of the chamber 40 sufficiently to permit the opening of the pressure retaining valve.

In Figs. 5 and 6, the reversing valve is dispensed with and the casing of the compound valve 60 is connected at one end directly to the pipe 4 and at the other end to the exhaust passage of the triple valve, 34. The train pipe 1, branch pipe 33, triple valve 34, auxiliary reservoir 36, and brake cylinder 35 are arranged as in the standard Westinghouse automatic system. The construction of the pressure retaining and charging valves is substantially the same as that shown in Figs. 3 and 4, differing in the particular that the exhaust ports 43 open directly to the atmosphere instead of to the lower part of the chamber 40. When arranged as shown in Figs. 5 and 6 the operation of the pressure retaining valve and charging valve is the same as in the arrangement previously described, except that the valves can be operated only by variations of pressure in the pipe 4, and that the pressure with which the brake cylinder may be charged through the pipe 4 is not limited by the pressure in the pipe 1.

I claim as my invention and desire to secure by Letters Patent—

1. The combination, with a fluid pressure automatic brake apparatus, of a supplemental line of pipe, a pressure retaining valve adapted to close a brake cylinder exhaust passage by pressure in said supplemental line, and a charging valve adapted to open a supply passage to a brake cylinder by pressure in the supplemental line in excess of that which suffices to seat the pressure retaining valve, substantially as set forth.

2. In a fluid pressure automatic brake apparatus, the combination of a main air or train pipe, a triple valve, a supplemental train pipe, a connection from one of said train pipes to the exhaust port of the triple valve, and a valve adapted to be opened by pressure from one of the train pipes to admit fluid under pressure through the triple valve exhaust port to the brake cylinder, substantially as set forth.

3. In a fluid pressure automatic brake apparatus, the combination of a main air or train pipe, a triple valve, a supplemental train pipe in which a different degree of pressure is maintained from that in the main train pipe, a charging valve adapted to admit fluid under pressure to the brake cylinder, and a reversing valve adapted to connect the charging valve with the train pipe having the lesser degree of pressure, substantially as set forth.

4. In a fluid pressure automatic brake apparatus, the combination of a main air or train pipe, a triple valve, a supplemental train pipe, a charging valve controlling a connection to the brake cylinder, and a reversing valve adapted to admit fluid under pressure from either line of train pipe to the charging valve, substantially as set forth.

5. In a fluid pressure automatic brake apparatus, the combination of a train pipe for the transmission of fluid under pressure, a triple valve controlling the supply and exhaust of fluid to and from a brake cylinder, a pressure retaining valve adapted to be closed by pressure in the train pipe, and a charging valve adapted to be opened by a higher degree of pressure in said pipe, substantially as set forth.

6. The combination, with a fluid pressure supply pipe and a cylinder in which pressure from said pipe is to be exerted, of a valve casing, a movable abutment fitted therein, a chamber on one side of the abutment which communicates with the supply pipe, a chamber on the other side of the abutment which is at all times open to the atmosphere, and a compound valve connected to the abutment and comprising a pressure retaining valve and a charging valve, for closing the exhaust from the brake cylinder and admitting pressure thereto respectively, substantially as set forth.

In testimony whereof I have hereunto set my hand.

RICHARD W. BAYLEY.

Witnesses:
 G. L. WEBB,
 JOHN F. MILLER.